June 8, 1926.

W. J. WORSLEY

ANIMAL TRAP

Filed Oct. 29, 1924

1,588,083

Witness:
Richard J. Jacker

Inventor:
W. J. Worsley
By J. McRoberts
his Atty.

Patented June 8, 1926.

1,588,083

UNITED STATES PATENT OFFICE.

WILLARD J. WORSLEY, OF DIXON, ILLINOIS.

ANIMAL TRAP.

Application filed October 29, 1924. Serial No. 746,530.

My invention relates to animal traps, and particularly to that class of traps in which a spring-actuated jaw or bail is employed. The main object of the invention is to provide a device of this character in which the spring actuated jaw or bail when moved to its set position automatically engages the latch or trigger which holds it in set or open position, without manual adjustment of the interlocking parts or setting of a catch. A further object is to provide a device of this kind in which the parts are so arranged that the device is easily tripped or sprung by an animal who bears against or on the trigger. This object is accomplished by placing the several parts in such a position that when the trap is set the tension of pull of the spring is nearly in a straight line or in the plane of the pivot of the jaw so that it requires a very slight pressure to maintain the jaw in a set position, on account of the nearly dead center line of the pulling stress of the spring. Other objects and advantages will be apparent from the disclosure of the several features of the invention.

The invention consists in the matters hereinafter described and then pointed out in the appended claims, and its features are illustrated in the accompanying drawing in which, Fig. 1 is a top plan view of the device showing the general arrangement of its parts when the jaw is closed;

Figure 1:
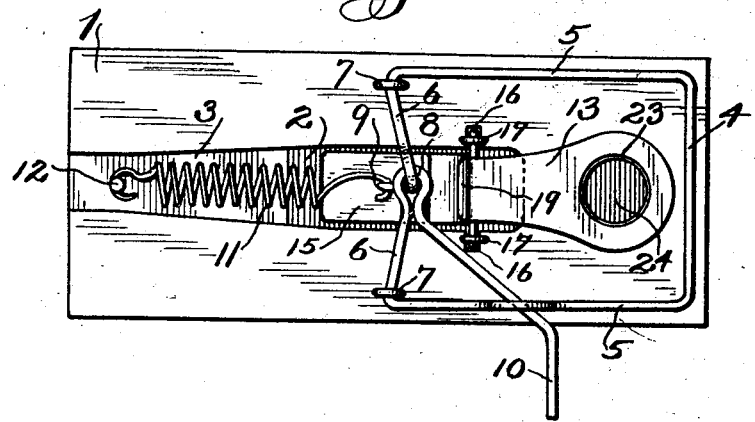
Figure 2:
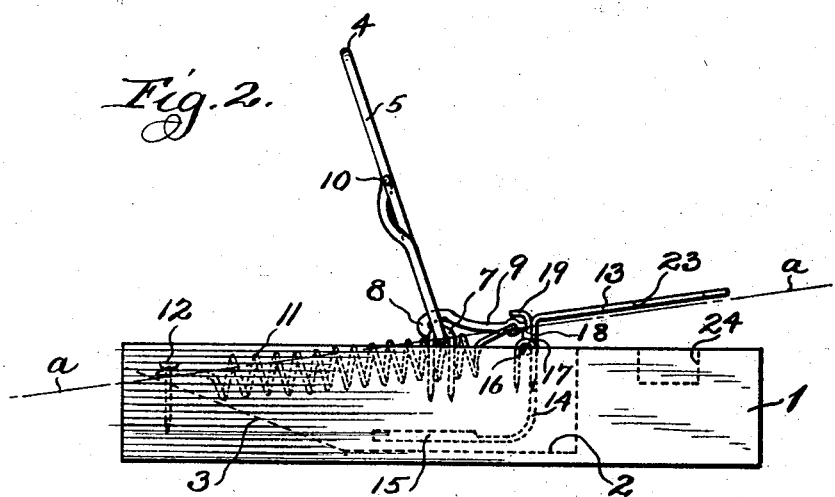
Fig. 2 is a side view showing the device in its set or open condition.
Figure 3:
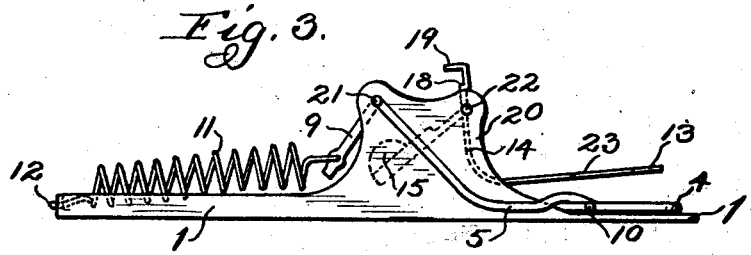
Fig. 3 is a side view illustrating a modified form of base or frame and with the parts in position when the trap is sprung.

In the drawing the same reference numerals represent the same or similar parts in the different views, and the various parts are the same in the two embodiments shown except that the frame in the form shown in Fig. 1 is a rectangular block of wood or other suitable material, and in the form shown in Fig. 3 it is of metallic construction. Referring first to Figs. 1 and 2, the frame 1 is provided in its upper surface in its median longitudinal line with a well or open-top chamber 2 which extends down into the body of the block to near its lower surface at approximately its central portion, and then inclines upwardly as shown at 3 to the rear of the block. A jaw, preferably in the form of an open bail formed of wire, is formed of sufficient width to lie just within the front and side margins of the block in front of the well when the jaw is closed down on the block, and this jaw in its form here shown comprises the front cross-arm 4 and the rearwardly extending opposite side legs 5, which latter are bent inwardly toward the center of the block to form pintles or pivots 6 which are carried in suitable bearings 7 conveniently formed by staples which are driven into the block on a line at approximately the center of the well 2. The inner portions of the pintles 6 are interlocked with each other over the well as shown at 8, and the free end of one of the pintles is extended in a downwardly and rearwardly extending pin 9 which swings in the well as the jaw is turned on its pivots, while the free end of the other pintle is bent outwardly and forwardly to form a handle 10 which passes under the corresponding side leg 5 of the jaw whereby the jaw can be raised to its set or open position. The free end of the pin 9 is connected to one end of a strong coiled spring 11 which is located in the chamber or well 2 and extends rearwardly in the inclined portion 3 thereof to near the rear end of the block where its opposite end is anchored as at 12; the stress of the spring tends to draw the pin 9 downwardly and rearwardly and snap the jaw down upon the front end of the block as shown in Fig. 1. A trigger or latch is formed with a wide upper plate 13 which extends forwardly from a point over the front end of the well toward the front of the block and within the spaced bounded by the arm 4 and legs 5 of the jaw, and with a depending skirt 14 which extends down into the well 2 and carries a weight 15. The skirt 14 is provided with lateral pivots 16 which turn freely in bearings on the upper surface of the block conveniently formed by staples 17, and with an upwardly facing lip or shoulder 18 which underlies and engages the free end of the latch pin 9 when the trap is set as shown in Fig. 2. The trigger has a rearwardly projecting wing 19 above the lip 18 to prevent the pin 9 from passing above the trigger in resetting the jaw to its open position.

In the form shown in Fig. 3 the frame 1 is a rectangular plate provided near its center with opposite marginal uprights 20 in which the jaw and trigger are pivoted. The jaw is of substantially the same construction of cross-arm and legs as in Fig. 1, the ends of its legs 5 being extended upwardly and inwardly to form pintles which are pivoted at 21 near the top of the rear ends of the uprights 20; one of the pintles is similarly formed with a latch pin 9 which extends downwardly and is connected to one end of the corresponding coil spring 11 which is anchored at its other end to the rear end of the base as at 12. The trigger is formed with a corresponding plate 13 having an upwardly extending skirt 14 and a weight 15, the skirt being pivoted at 22 to the top of the front ends of the uprights 20 and having a corresponding lip or shoulder 18 to engage the free end of the pin 9 and a wing 19 overlying the latter. The jaw is preferably provided with a handle 10, which may be conveniently formed by extending the second pintle of the jaw.

In both forms here shown, when the jaw is raised to its set or open position the latch pin 9 wipes past the lip 18 which is then swung into engagement with it by its weight 15, it being understood that the inwardly extended pintles 6 of the jaw are sufficiently bowed upwardly to clear the spring when the jaw is thus set. It is obvious from the disclosure that the trigger automatically engages the latch pin of the jaw when the latter is set, whereby the trap is operated to its open or set position by merely raising the jaw and without manual adjustment of the interlocking parts or setting of a catch. Also, in this set position the pull line of the spring and the pivotal axis of the jaw are in the same plane so that the stress of tension of the spring on the latch pin 9 of the jaw is very slight and the consequent pressure of this pin on its locking lip 18 of the trigger is correspondingly slight, with the advantageous result that the trigger is very sensitive and can be easily tripped to release the pin to allow the spring to quickly and powerfully draw the jaw down to closed or sprung position.

This relation of the parts is the same in both forms and is indicated by the straight line a—a in Fig. 2 which passes through the pivotal line of the jaw and the connections or anchorages of the jaw-actuating spring to the frame and the latch pin, with the lip of the trigger in alinement with the set position of the latch pin; it affords a sensitive and easily released trigger and enables the spring to exert its full tension on the jaw at the instant that the trigger is moved.

In both forms the plate 13 of the trigger may serve as the support for the bait and may be provided with an opening to hold it, but it is preferable, inasmuch as the trigger is very sensitive, to place the bait in a receptacle in the frame thus not throwing the trigger out of balance and destroying the automatic setting feature which is the chief object of the invention.

I claim:

1. In an animal trap, a frame, a jaw pivoted on the frame to close down thereon, a downwardly extending central latch pin rigid with the jaw, a spring to close the jaw on the frame, a trigger pivoted on the frame and carrying a weighted lip and an overhanging wing in the path of the pin when the jaw is swung on its pivot, the lip and latch-pin being oppositely positioned and so arranged that the lip automatically engages the pin when the jaw is swung up to its set position.

2. In an animal trap, a frame, a jaw pivoted on the frame and having a swinging catch-pin, a spring connected at its opposite ends to the pin and frame substantially in the plane of the pivot of the jaw when the latter is set, a weighted trigger having a bait plate and a lip to underlie the pin.

3. In an animal trap, a frame, a jaw comprising an open bail having inwardly extended pintles pivoted on the frame and forming a catch pin, a trigger pivoted on the frame and having a lip to engage the pin when the jaw is set, and a coil-spring connected to the frame and pin, the parts being so arranged that the spring-connections are substantially in the plane of the axis of the jaw when the latter is set.

In testimony whereof I hereto affix my signature.

WILLARD J. WORSLEY.